United States Patent
Courtay

(10) Patent No.: US 8,429,714 B2
(45) Date of Patent: Apr. 23, 2013

(54) METHODS AND APPARATUSES FOR INTRODUCING DEVICES WITH SIMPLE USER INTERFACES INTO A SECURE NETWORK COMMUNITY

(75) Inventor: Olivier Courtay, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 1053 days.

(21) Appl. No.: 11/919,459

(22) PCT Filed: Apr. 10, 2006

(86) PCT No.: PCT/EP2006/061483
§ 371 (c)(1),
(2), (4) Date: Oct. 29, 2007

(87) PCT Pub. No.: WO2006/117277
PCT Pub. Date: Nov. 9, 2006

(65) Prior Publication Data
US 2009/0025058 A1  Jan. 22, 2009

(30) Foreign Application Priority Data
May 2, 2005 (EP) .................................... 05300348

(51) Int. Cl.
G06F 21/20 (2006.01)
(52) U.S. Cl.
USPC ............................................................ 726/3
(58) Field of Classification Search ........................ 726/3
See application file for complete search history.

(56) References Cited

U.S. PATENT DOCUMENTS

| | | | |
|---|---|---|---|
| 7,120,667 B2 * | 10/2006 | Derocher et al. | 709/204 |
| 7,962,154 B2 | 6/2011 | Nakakita et al. | |
| 2001/0029166 A1 * | 10/2001 | Rune et al. | 455/41 |
| 2003/0207683 A1 * | 11/2003 | Lempio et al. | 455/422.1 |
| 2004/0258033 A1 | 12/2004 | Heinonen et al. | |
| 2005/0031110 A1 | 2/2005 | Haimovich et al. | |

FOREIGN PATENT DOCUMENTS

| | | |
|---|---|---|
| EP | 1107522 | 6/2001 |
| EP | 1411674 | 4/2004 |
| JP | 2000013376 A | 1/2000 |

(Continued)

OTHER PUBLICATIONS

The Bluetooth Forum: "Bluetooth security" Bluetooth Standard, Feb. 22, 2001, pp. 148-182.

(Continued)

*Primary Examiner* — Gilberto Barron, Jr.
*Assistant Examiner* — Devin Almeida
(74) *Attorney, Agent, or Firm* — Robert D. Shedd; Jeffrey M. Navon

(57) ABSTRACT

A method for introducing devices with simple user interfaces into a network community. A user pushes a button on a first device that listens for messages from central points for two seconds and, if no such message is received, becomes a central point and starts sending broadcast ID messages. The user the pushes a button on a second device to be insert, which after interaction with the central point enters a selected state. Noticing this on the user interface of the second device, the user pushes the button on the first device again, and after further communication between the devices, they enter an associated state, which can be verified on the user interface of the first device. Also provided is a first device.

7 Claims, 3 Drawing Sheets

FOREIGN PATENT DOCUMENTS

| | | |
|---|---|---|
| JP | 2001016219 A | 1/2001 |
| JP | 2002185458 A | 6/2002 |
| JP | 2002247109 A | 8/2002 |
| JP | 2003186817 A | 7/2003 |
| JP | 2004048250 A | 2/2004 |
| JP | 2005027084 A | 1/2005 |

OTHER PUBLICATIONS

Search Report Dated Jul. 17, 2006.

* cited by examiner

METHODS AND APPARATUSES FOR INTRODUCING DEVICES WITH SIMPLE USER INTERFACES INTO A SECURE NETWORK COMMUNITY

This application claims the benefit, under 35 U.S.C. §365 of International Application PCT/EP2006/061483, filed Apr. 10, 2006, which was published in accordance with PCT Article 21(2) on Nov. 9, 2006 in English and which claims the benefit of European patent application No. 05300348.9, filed on May 2, 2005.

FIELD OF THE INVENTION

The present invention relates generally to secure networks, and in particular to the insertion into a secure community of one or more devices with a simple user interface.

BACKGROUND OF THE INVENTION

An important security problem with computer networks is that humans are involved. Administrating such a network requires specific knowledge, which the average user rarely has. For this reason, a user faced with complicated user interfaces often opts for the lowest level of security, sometimes even removing it completely. It can thus clearly be appreciated that there is a need for an easy way to facilitate the task for the user as much as possible, while keeping security at an acceptable level.

European patent application EP 1411674 A1 presents a solution where a central point, at the simple click of a button, restricts the coverage of the radio waves it transmits. Then the user activates a function on a device within the reduced coverage area to insert it into the network of the central point. A disadvantage with this solution is that it is rather vulnerable to various kinds of attacks, such as for example the well-known man-in-the-middle attack.

The present invention attempts to remedy at least some of the security concerns connected with the prior art, while enabling a user to create a secure community of devices that may be equipped with very simple user interfaces.

SUMMARY OF THE INVENTION

In a first aspect, the invention is directed to a method of introducing at least one device into a secure network that comprises a central point instructed to insert the at least one device into the secure network. The method is suitable to be performed when the at least one device and the central point have no previous knowledge of the other A user instructs the at least one device to request insertion into the secure network from the central point. The at least one device requests from the central point insertion into the secure network, whereupon the central point verifies that an expected number of devices have requested insertion into the secure network before inserting the at least one device into the secure network.

In a preferred embodiment, the central point has been instructed by the user to insert the at least one device into the secure network.

It is advantageous that the instruction to insert at least one device into the secure network comprises the number of devices to be inserted.

It is also advantageous that the instruction to insert at least one device into the secure network was given to a device that upon this instruction began acting as a central point. The instructed device preferably ensures that there is no active central point in the network before it begins to act as one. It does so by waiting a predetermined time for a message from a central point in the network and deciding that there is no active central point in the network if no message is received during the predetermined time.

In another preferred embodiment, prior to the verification step, the user instructs the central point to proceed with the insertion.

In a further preferred embodiment, the user gives instructions via a simple user interface.

In a second aspect, the invention is directed to a central point adapted to introduce at least one device into a secure network. The central point has been instructed to insert at least one device into the secure network, but does not necessarily have any previous knowledge of the at least one device. The central point comprises a communication unit adapted to communicate with the at least one device, and to receive from the at least one device a request for insertion into the secure network; a processor adapted to communicate with the communication unit and to insert the at least one device into the secure network, and to verify that an expected number of devices have requested insertion into the secure network before inserting the at least one device into the network.

In a preferred embodiment, the central point is adapted to receive an instruction from a user to insert the at least one device into the secure network.

It is advantageous that the instruction to insert the at least one device into the secure network comprises information on the number of devices to be inserted.

It is also advantageous that the central point is adapted to as a device before reception of the instruction to insert the at least one device into the secure network. It is preferable that the processor is further adapted to ensure that there is no active central point in the network. This is achieved by waiting a predetermined time for a message from a central point in the network and deciding that there is no active central point in the network if no message is received by the communication unit during the predetermined time.

In another preferred embodiment, the central point comprises a user interface adapted to receive instructions from the user to proceed with the insertion.

It is advantageous that the central point comprises a user interface adapted to receive the instruction to insert the at least one device into the network.

It is advantageous that the user interface comprises a button adapted to receive the instructions. It is also advantageous that the user interface comprises a LED adapted to signal to the user a state of the central point.

In a third aspect, the invention is directed to an apparatus in a secure network. The device is adapted to, upon instruction by a user, act as a central point adapted to insert at least one device into the secure network, without previous knowledge of the at least one device, if the secure network comprises no active central point and to act as a device if the secure network comprises an active central point.

In a fourth aspect, the invention is directed to a method of configuring an apparatus in a secure network. Upon reception of an instruction from a user, the device verifies if there is a central point in the secure network; and if this is not the case, it begins acting as a central point adapted to insert at least one device into the secure network, without previous knowledge of the at least one device.

In a fifth aspect, the invention is directed to a system for introducing at least one device into a secure network comprising a central point instructed to insert the at least one device into the secure network. The at least one device and the central point need not have any previous knowledge of one another. The at least one device is adapted to receive an instruction from a user to request from the central point insertion into the secure network; and to request from the central point insertion into the secure network. The central point is adapted to insert the at least one device into the secure network after having verified that an expected number of devices have requested insertion into the secure network.

In a sixth aspect, the invention is directed to a method of introducing by a central point a given number of devices into a secure network. The central point is instructed to introduce a given number of devices into the secure network, the central point not necessarily having any previous knowledge of the given number of devices. The central point receives a request for insertion into the secure network from at least one device, verifies that the given number of devices have requested insertion into the secure network, and inserts the given number of devices into the secure network.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

Figure 1:
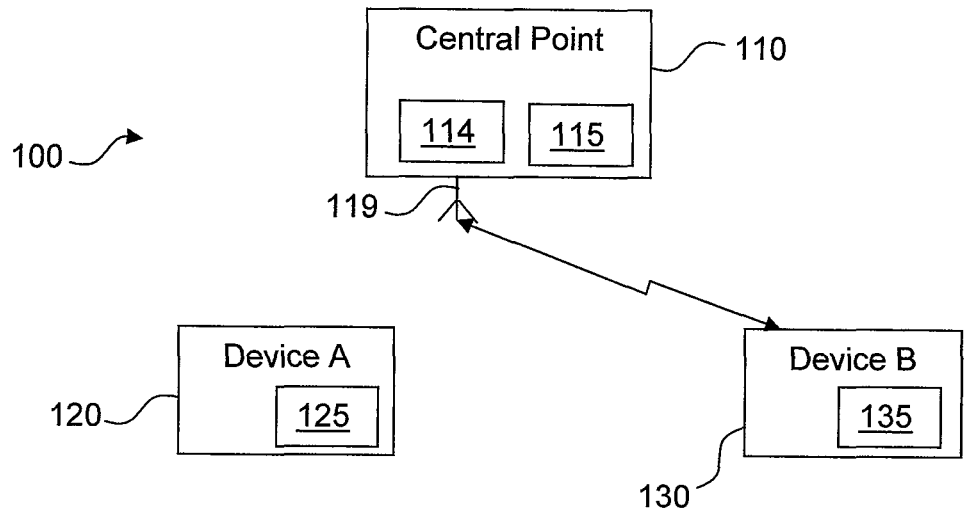
FIG. 1 illustrates an exemplary community in which the invention is used.

FIG. 1 illustrates an exemplary community 100 in which the invention is used. The community 100 comprises a central point 110 and a device B 130. It should be noted that in a preferred embodiment, the central point is a device acting as a central point during the insertion only, after which it stops acting as a central point. The user (not shown) is about to introduce device A 120 into the community 100. The central point 110, device A 120 and device B 130 (all of which may jointly be referred to as 'devices') all have a user interface 115, 125, and 135, respectively. The user interface is preferably a simple user interface that comprises a button and at least one LED, as further described in FIG. 2.

The central point 110 comprises a communication unit 119, illustrated by an antenna, for interaction with other devices. The communication unit preferably uses radio technology for communication, but other means of communication, such as for example infrared light, may also be used. In addition, the central point 110 comprises a memory (not shown) and a processor 115 for calculation, verification, and for controlling the central point.

Figure 2:
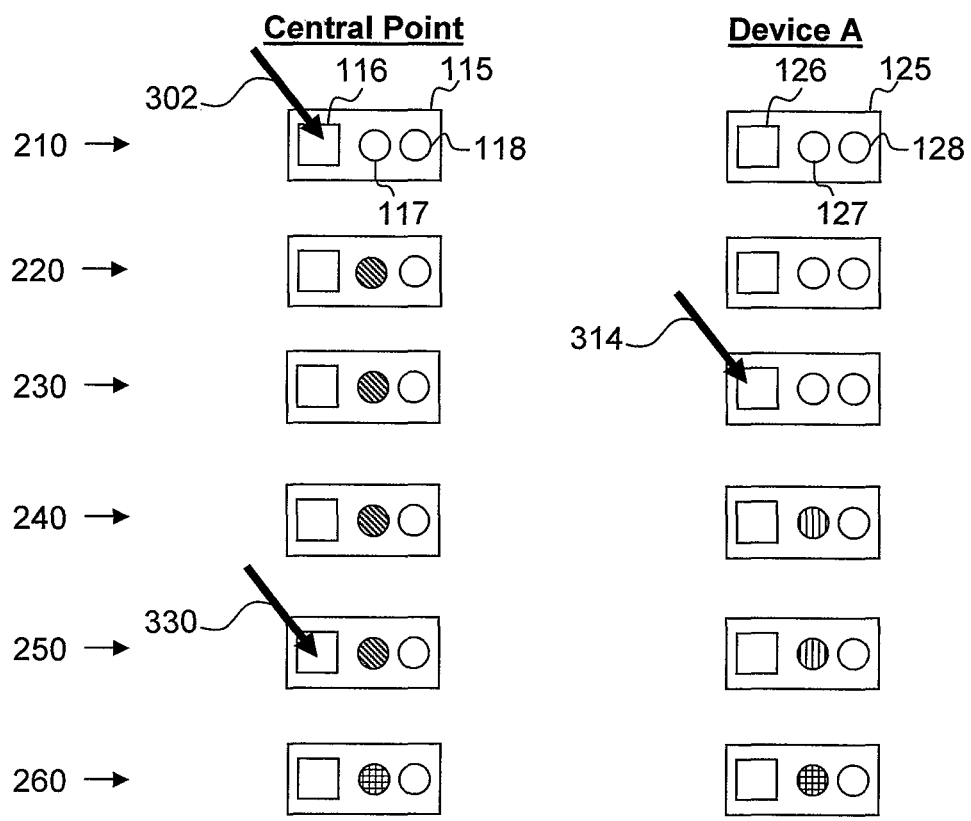
FIG. 2 illustrates an exemplary simple user interface for use with the invention.

FIG. 2 illustrates an exemplary simple user interface for use with the invention. The figure shows the user interface 115 of the central point 110 and the user interface 125 of device A 120 during the insertion of device A 120 into the community 100, following the method described in FIG. 3. It will be assumed to facilitate illustration that the two user interfaces are identical. Each user interface 115, 125 comprises a button 116, 126 and two LEDs 117, 118 and 127, 128, respectively. The button 116, 126 may be a real button, but it may also be emulated, e.g. on a screen, or be voice activated; whatever its implementation, it causes a specific function to be executed when activated. The words "push the button" should be interpreted as "perform the action" that is necessary to cause the execution of the function. As will be further described hereinafter, the first LED 117, 127 indicates the state of the device, while the second LED 118, 128 is adapted to indicate any errors. Before the start of the method, both LEDs 117, 127 and 118, 128 of both devices 110 and 120 are inactive, which is indicated by reference number 210.

Figure 3:
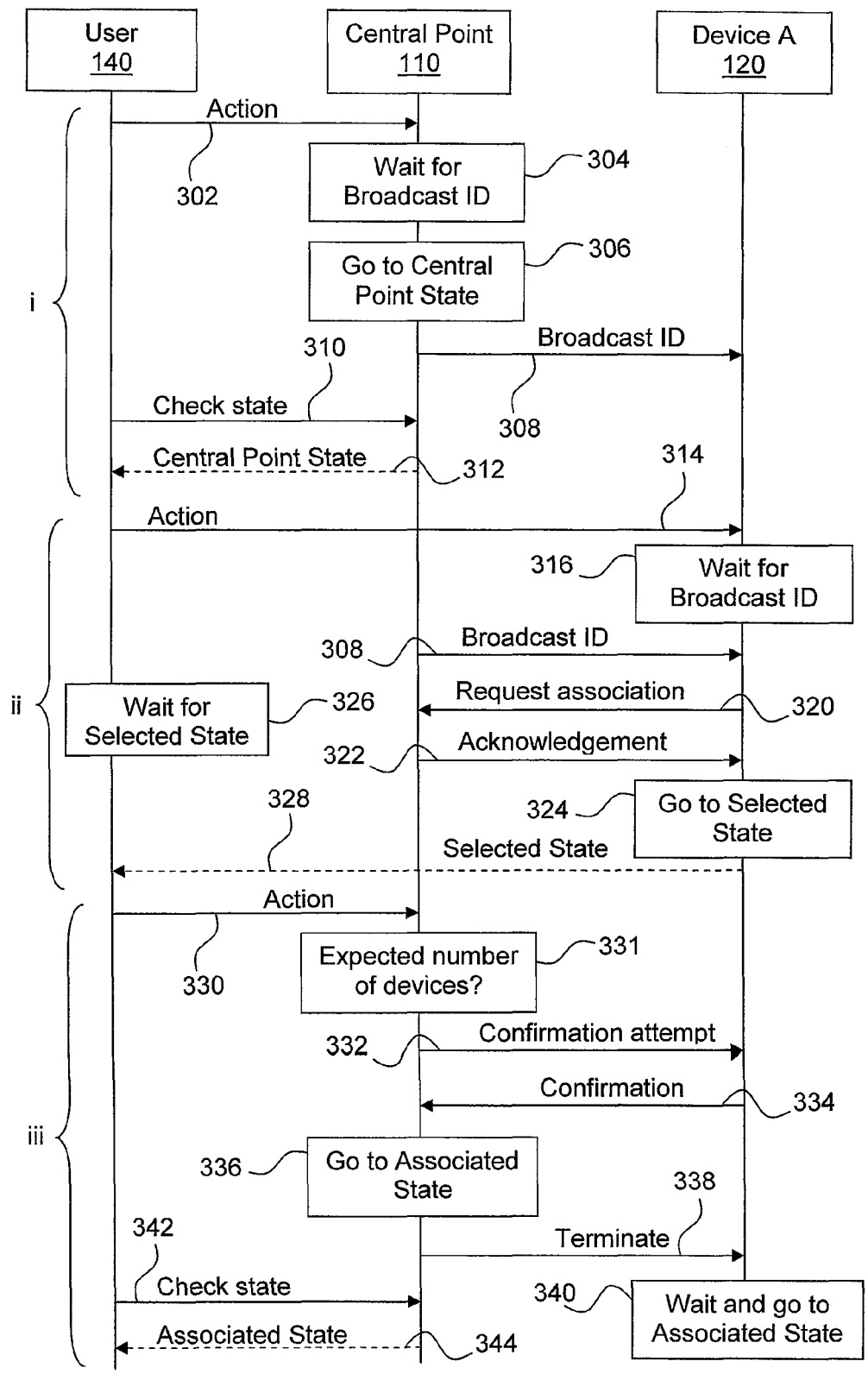
FIG. 3 illustrates a flowchart of the method for device insertion according to the invention.
Figure 4:
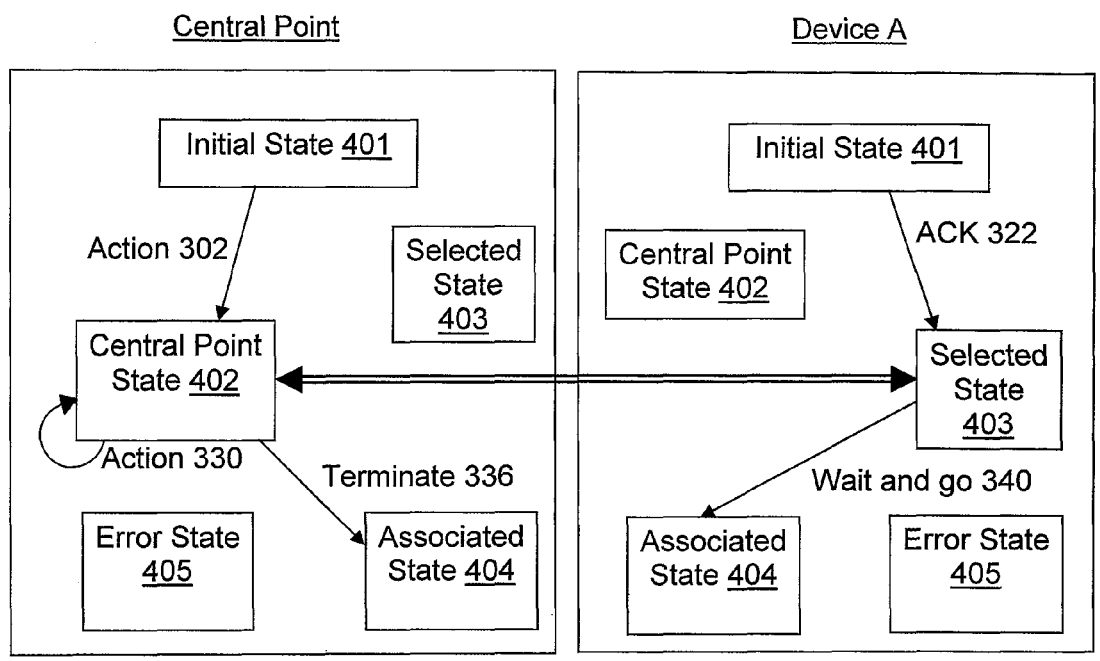
FIG. 4 illustrates a state diagram for two devices, corresponding to the method illustrated in FIG. 3.

The method for insertion of a device into a community will now be described with reference to FIG. 2 (user interfaces), FIG. 3 (method flowchart), and FIG. 4 (state diagram). It should be noted that, contrary to the example in FIG. 1, the Central Point 110 is a "normal" device without any connections to other devices when the method commences and that it becomes a central point during the execution of the method.

There are three general parts of the process:

i The election part (302-312 in FIG. 3): during this part, the central point is selected.

ii The "hello" part (314-328 in FIG. 3): communication between the central point and the at least one device to be inserted is initiated during this part. This part is repeated for each device to be inserted.

iii The "check" part (330-344 in FIG. 3): the at least one association is confirmed during this part.

The method will now be described in detail. The method starts when the user 140 pushes the button 116 of the Central Point 110, step 302 "Action" (indicated by arrow 205 in FIG. 2). The Central Point 110 first waits a predetermined time, preferably two seconds, for a Broadcast ID message, step 304. Every central point broadcasts such a message every two seconds, so if the Central Point 110 does not receive a Broadcast ID message within that time, then there is no (active) central point in its vicinity. Naturally, if central points broadcast these messages with another interval than every two seconds, the predetermined time should be adjusted accordingly. On the other hand, if the Central Point 110 receives a Broadcast ID message, then it is to be inserted as a normal device into the community of the central point that broadcast the message, i.e. it takes the place of device A (and step 302 is in reality step 314, as will be further described hereinafter with reference to that device).

In other words, during step 304 the device discovers if it is in the presence of a central point or not. If this is the case, it acts as a simple device; if this is not the case, it shoulders the role of the central point. This arrangement ensures that there is no more than a single active central point in the network at a given time.

After the predetermined wait, the Central Point 110 goes from the Initial State (401 in FIG. 4) into the Central Point State (402 in FIG. 4)—indicated by a slow blink of the first LED 117 (diagonal stripes; 220 in FIG. 2)—and becomes a real central point, step 306. Being a central point, it begins broadcasting Broadcast ID messages 308. The broadcast messages 308 are ignored by device A that at this point is in the Initial State 401.

The user 140 then checks the user interface 115 of the Central Point 110, step 310, and notices that it, correctly, indicates that the Central Point 110 is in the Central Point State 402, step 312.

When the user 140 is satisfied that the Central Point 110 is in the correct state, he goes to device A 120, which is in the Initial State 401, and pushes the button, step 314 (230 in FIG. 2). Once thus activated, device A 120 waits a predetermined time for a Broadcast ID message 308 from a central point, step 316. In this case, since the user 140 has caused the Central Point 110 to go into the Central Point State 402, a Broadcast ID message 308 is broadcast and received before the end of the predetermined time.

Device A 120 then sends a Request Association message 320 to indicate that it wishes to enter the community of the Central Point 110, which upon reception of this message responds with an Acknowledgement message 322. When device A 120 receives the acknowledgement 322, it goes into the Selected State 403, step 324, which is indicated on the user interface 125 by a quick flashing of the first LED 117 (328, illustrated by vertical stripes in FIG. 2, 240).

The user 140 who has been waiting (step 326) for this indication now returns to the Central Point 110 and presses the button 116 again, step 330 (250 in FIG. 2). After having verified (step 331) that it has received requests from and sent acknowledgements to the expected number of devices—in this case, one—the Central Point 110 then sends a Confirmation attempt message 332 to device A 120, which replies with a Confirmation 334. The Central Point 110 then goes into the Associated State 404 and sends a Terminate message 338 to device A 120 to indicate that the association has been correctly performed and that device A 120 has been properly inserted into the community 100.

Device A 120 receives the Terminate message 338, waits a predetermined time (further described hereinafter) and goes, step 340, to the Associated State 404. FIG. 2, reference number 260 illustrates that both the Central Point 110 and device A 120 indicate via their user interfaces 115, 125 that they are in the Associated State 404 by a continuous green light of the first LED 117. The user 140 checks the state of the Central Point 110, step 342, and is content to see that the insertion of device A 120 into the community 100 of the Central Point 110 was successful, as indicated (344) by the user interface.

While the method as described hereinbefore illustrates the introduction of one device into a community, the invention also provides the possibility to introduce a number of devices. Apart from using the method as described to introduce one device at a time, it is also possible to make this process easier. It should be noted that the description hereinafter may leave out parts that have already been explained hereinbefore.

Suppose that the user 140 desires to introduce N devices 120, 130 into the community 100 of the central point 110, which as already explained may be an ordinary device when the method begins. For N devices, the method may be said to comprise one election part (slightly different from the one described hereinbefore), N hello parts, and one check part. It should be noted that if there is an active central point in the community, the election part has already been performed and need not be gone through again.

The user 140 begins by going to the (future) Central Point 110 and pushing the button 116 N times, with preferably less than two seconds between each push. After the last push of the button 116, the Central Point 110 waits for a Broadcast ID message during two seconds and, if no such message is received, goes to the Central Point State.

The user 140 uses the user interface 115 to check that the Central Point 110 has properly reached the Central Point State. For each of the N devices in turn, the user then pushes the button and checks that the device enters the Selected State. The user goes back to the Central Point, pushes the button again, and verifies that the Central Point goes into the Associated State.

The user has then successfully introduced the N devices into the community of the Central Point.

The Central Point 110 counts the number of devices it is supposed to introduce into its community, step 331, so it is able to verify that the number of introduced devices is correct.

If there are too many devices, this may mean that a hacker has tried to introduce one or more devices into the community, and the Central Point goes to the Error State 405 and rejects every device introduced during the current introduction session.

On the other hand, if there are too few devices, this may mean that the user has forgot about one or more devices or that a device has communicated with the wrong central point. In this case too, the Central Point goes to the Error State 405 and rejects every device introduced during the current introduction session.

If a device detects a security problem, such as if it detects a packet with the identifier of the device, sent by another device or if a second central point has been detected, it sends a Failed message to its Central Point. The Central Point sends or forwards, as appropriate, Failed messages to all the devices about to be introduced in the current introduction process. Upon reception or sending, as appropriate, of a Failed message, the devices go to the Error Stage 405, preferably indicated by a red light on the second LED 118, 128.

There are several possible ways for a device to leave the error stage, of which two examples will be given. A first way is to wait a predetermined time, such as one minute, and then go to the Initial State 401. A second way is for the device to remain in the Error Stage 405 until the user pushes the button 116, 126, and only then go to the Initial State 401.

In order for the devices to enable subsequent secure mutual authentication, the invention proposes the following preferred message scheme:

TABLE 1 message format and content

| | Header | Sender information | Destination information |
|---|---|---|---|
| Broadcast ID | 000 | X | — |
| Request association | 001 | Y | X |
| Acknowledgement | 010 | X | Y |
| Confirmation attempt | 011 | X | — |
| Confirmation | 100 | Y | X |
| Terminate | 101 | X | — |
| Failed | 110 | X or Y | — |

The header distinguishes the type of message. X represents the provable identity of the public key of the Central Point, such as a 160-bit hash of the public key. Y represents the provable identity of the public key of the device, such as a 160-bit hash of the public key.

An alternative embodiment uses a dedicated central point and dedicated devices. In this case, the method and the interface of the devices may be simplified. Since the central point is always a central point, there is normally no need for the first part of the method, 302-312, where a device otherwise would discover if it should act as a central point or a "normal" device, although the user could still check that the central point is in the Central Point State and not in the Error State. Furthermore, the button and the second LED may be removed from the devices, as a reset or power on of a device may trigger the action 314 and any errors may be seen on the central point.

The invention is, as partly mentioned hereinbefore, resistant to attacks from hackers. If a hacker attempts to introduce a fake device, the central point will notice that the number of devices is incorrect and send Failed messages. If a hacker attempts to use a fake central point to associate with a device, the device will realise that it receives Broadcast ID messages from two different central points and send a Failed message. Even if the fake central point duplicates the Broadcast ID messages from the real central point, the device realises that it receives Broadcast ID message from more than one central point as the messages arrive twice as often as expected. To counter fake Terminate messages, the device waits a predetermined time upon reception of such a message before going to the Associated State. This gives the central point time to receive the fake message, realise that the message is fake, and send a Failed message to the device that is not yet in the Associated State.

It will be appreciated that the method is suitable for use also when two devices, one acting as a central point and the other acting as a device to insert, have no previous knowledge of one another.

It should be noted that where, in the description and the claims, it says that a device is part of the secure network even though logically it is not part thereof since it is about to be inserted therein, the words 'part of the network' should be interpreted as 'being able to communicate with the secure network and to deduce if there is an active central point therein'.

It can thus be appreciated that the present invention improves upon the prior art by providing a secure way to introduce devices with, primarily, simple user interfaces into a community.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of introducing by a first device a given number of further devices into a secure network, the method comprising the steps, at the first device, of:

receiving an instruction to introduce a given number of further devices into the secure network;

receiving a request for insertion in the secure network from each of a number of further devices;

inserting into the secure network each further device from which a request for insertion has been received;

verifying that a number of inserted further devices is equal to the given number of further devices; and rejecting the inserted devices in case the number of inserted further devices is not equal to the given number of further devices.

2. The method of claim 1, further comprising the step, prior to the verification step, of receiving by the first device an instruction to proceed with the insertion of the given number of further devices.

3. The method of claim 1, wherein instructions are received via a simple user interface.

4. A first device adapted to introduce a given number of further devices into a secure network, the first device comprising:

a communication unit adapted to communicate with further devices, and to receive from each of a number of devices a request for insertion into the secure network;

a processor adapted to:

communicate with the communication unit, insert into the secure network each further device from which a request for insertion has been received, and verify that a number of inserted further devices is equal to the given number of further devices; and reject the inserted devices in case the number of inserted further devices is not equal to the given number of further devices; and an interface adapted to receive an instruction to insert a given number of further devices into the secure network.

5. The first device of claim 4, wherein the interface is further adapted to receive instructions to proceed with the insertion.

6. The first device of claim 5, wherein the interface comprises a button adapted to receive the instructions.

7. The first device of claim 5, wherein the interface comprises a LED adapted to indicate the state of the first device.

* * * * *